May 30, 1933.  R. H. TAYLOR  1,911,777
GAS DEMAND RECORDING METER
Filed July 11, 1928  2 Sheets-Sheet 1
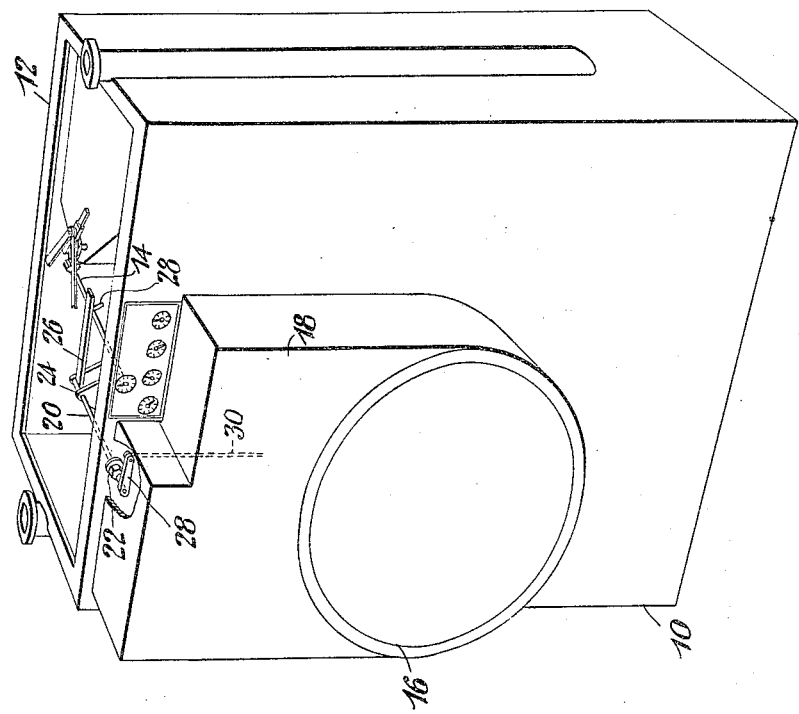
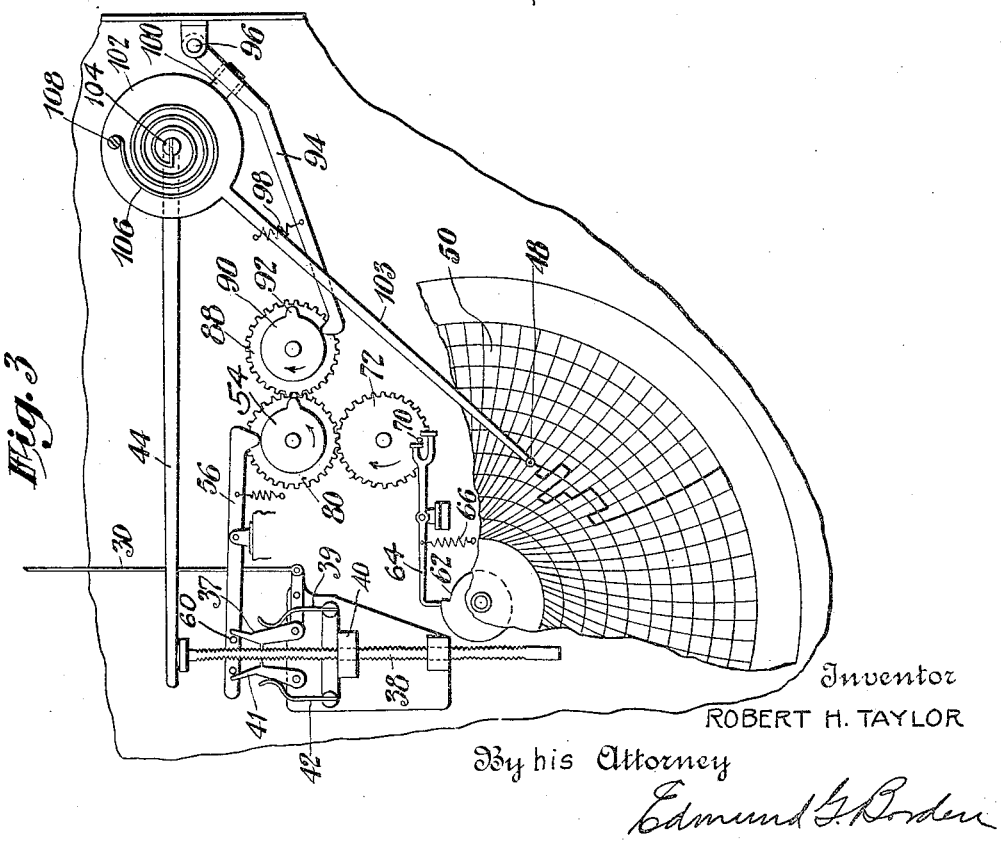
Inventor
ROBERT H. TAYLOR
By his Attorney
Edmund G. Borden May 30, 1933.  R. H. TAYLOR  1,911,777
GAS DEMAND RECORDING METER
Filed July 11, 1928   2 Sheets-Sheet 2
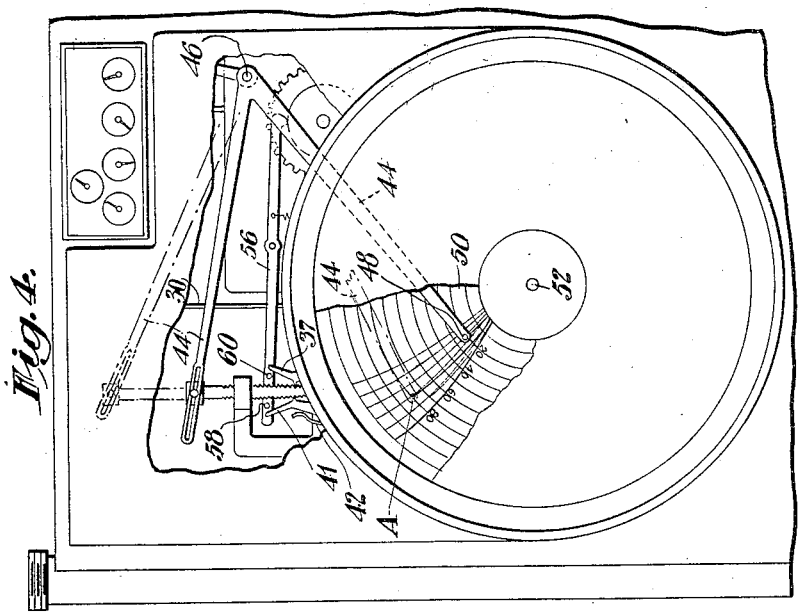
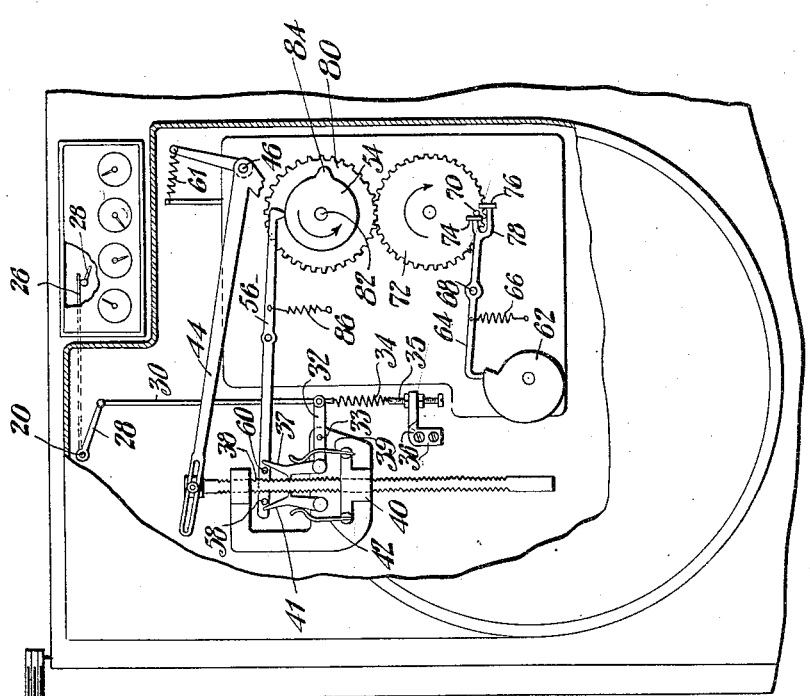
Inventor
ROBERT H. TAYLOR
By his Attorney
Edmund G. Borden Patented May 30, 1933

1,911,777

UNITED STATES PATENT OFFICE

ROBERT H. TAYLOR, OF DENVER, COLORADO, ASSIGNOR TO DOHERTY RESEARCH COMPANY, OF NEW YORK, N. Y., A CORPORATION OF DELAWARE

GAS DEMAND RECORDING METER

Application filed July 11, 1928. Serial No. 291,859.

This invention relates to fluid meter apparatus and more particularly to apparatus for automatically taking a permanent record of the rate at which fluid is withdrawn from a source of supply during any unit interval of time.

The introduction of the three part rate and other multiple part rate systems of charging for fluid use, such as for gas household and industrial heating service, particularly such systems as base a portion of their structure upon the maximum volume of gas or other fluid used per unit interval of time, has created a demand for accurate, economical and simple devices for taking a more or less permanent record of the rate of flow of fluids, such record being thereafter available as a basis for calculating the maximum demand charge to be made against the fluid user under the aforementioned three part or other multiple rate system of charging.

One object of the present invention is to provide apparatus for taking automatically a permanent record of the maximum rate at which fluid is withdrawn from a source of supply during any unit interval of time.

A number of devices are now obtainable intended for use in making a record of the maximum demand of a customer on the equipment of a gas company during a unit interval of time. So far as is known, however, none of the demand recording devices which are now available have proven to be in all respects entirely satisfactory in service out of their own particular field. Moreover so far as is known there is no demand recording device at present available possessing all the advantageous characteristics of low initial cost, low maintenance cost, high degree of accuracy in operation and which is at the same time of sufficiently rugged construction to satisfactorily withstand the severe uses to which such apparatus is normally subjected.

Accordingly another object of the present invention is to provide a fluid demand recording device of simple and rugged construction which is accurate in operation over either long or short time intervals and which embodies the advantageous features of low initial cost and low maintenance cost.

Another object of the present invention is to provide fluid demand recording apparatus that is flexible in its application and has a broad field of service.

In order to insure that any fluid demand recording apparatus will have a broad field of service it is of great importance that it embody a recording device of a type that can be physically and operatively connected at small expense and with minimum labor to any one of a large number of different types of fluid volume meters such as are now in service in different parts of the country. Moreover it is of great importance that the several parts of the fluid demand recording device be protected not only from mechanical injury through dust and corrosion but also from danger from tampering or interference by unauthorized persons.

One feature of the present invention contemplates a fluid demand recording apparatus which in its assembled form will embody means for effecting physical and operative connection between almost any type of fluid volume meter and almost any type of chronometrically operated demand recording instrument.

In my co-pending application, Serial No. 195,966 I have described fluid demand recording apparatus embodying a chronometrically driven recording instrument, the operation of which is controlled electrically, such electrical control being necessarily powered from a source of electrical energy outside of the meter mechanism.

Another object of the present invention is to provide fluid demand recording apparatus having its vital parts protected from mechanical injury and from danger due to tampering with and interference by unauthorized persons and which is entirely self contained, so far as its operating parts are concerned, having no outside connections other than the normal volume meter fluid inlet and outlet connections.

Another object of the present invention is to provide fluid demand recording apparatus of a constant integrating type capable of affording an instantaneous reading of the rate of withdrawal of fluid from a source of supply in terms of unit volume per unit time interval.

With these and other objects and features in view, the invention consists in the improved fluid demand recording apparatus hereinafter described and more particularly defined in the claims.

The various features of the fluid demand recording apparatus forming the subject of the present invention are illustrated more or less diagrammatically in the accompanying drawings, in which:—

Fig. 1 is a front perspective view of a preferred embodiment of the present invention with part of the top removed to illustrate a convenient arrangement of a fluid volume meter, recording instrument, and mechanism operatively connecting the same.

Fig. 2 is a fragmentary front elevation with parts broken away showing in more complete detail a part of the mechanism operatively connecting the meter and recording instrument.

Fig. 3 is a fragmentary front elevation illustrating a slight modification of the connecting mechanism of Fig. 2 and showing the manner in which such mechanism is operatively connected to the recording member of the recording instrument.

Fig. 4 is a view in front elevation of the recording instrument with parts broken away to illustrate the relative positions of the chart and operating mechanism shown in Figs. 1, 2 and 3, in the assembled unit.

Fig. 5 is a top plan view of a portion of the chronometrically operated releasing mechanism shown in Fig. 2.

Essentially the fluid demand recording apparatus which forms the subject of the present invention embraces an ordinary fluid meter of the volume measurement type such as a diaphragm meter, rotary meter or rotary displacement meter, to which is operatively connected a clock driven recording instrument. Each time a unit volume of fluid passes through the volume meter, suitable mechanism is provided for advancing the recording member of the recording instrument a certain unit distance across the recording chart. The maximum distance traversed by the recording member during any fixed interval of time represents the quantity of fluid passed by the meter in this interval. If the time interval is properly chosen (depending on the nature of the load, the class of record desired, and the like) it may be safely assumed that the rate of flow of fluid during the period of measurement is uniform, and thus the demand can be taken as the consumption during that unit period. An important feature of the present apparatus is that all the moving parts are powered or driven by clock work housed within the recording instrument or by the volume meter mechanism itself, so that the apparatus is entirely self-contained and has no outside connections other than the normal fluid meter inlet and outlet connections.

In the drawings 10 represents a common form of domestic gas meter housed within a sealed casing 12, usually of tin or sheet iron construction. In the upper portion of the meter 10 there is mounted an index axle 14 which forms a part of the standard meter mechanism and is arranged for rotation by, and at a speed which is at all times proportional to the rate of flow of, fluid (i. e., gas) flowing through the meter. Normally the index axle rotates in a counter clockwise direction. The manner in which the axle 14 and the other parts of the meter are connected together and powered by the fluid passing through the meter are well-known, and accordingly any further description thereof is deemed unnecessary. For a clear description of the operation of a meter of this type, reference can be had to my co-pending application above referred to.

Attached to the front face of the meter 10 (preferably permanently) is a chronometrically operated recording instrument 16 housed in a casing 18. A shaft 20 is journaled in a bearing 22 mounted in the casing wall or walls separating the meter and recording instrument, the one end of the shaft 20 extending into the casing 18 and the other into the meter casing 12, in which it is supported by a bearing 24. In the drawings the shaft 20 is illustrated as lying in substantially the same horizontal plane as index axle 14 and as extending in a substantially parallel direction to the index axle at right angles to the front face of meter 10. Fulcrumed on the meter end of shaft 20 is a trip lever 26 of such length that it lies in the path of a radial pin 28 rigidly affixed to axle 14. The arrangement of trip lever 26 with respect to pin 14 is such that the free end of the lever normally rests on the index shaft in position to be displaced upwardly by said pin once during each revolution of the index axle. In this manner the shaft 20 is caused to oscillate through a small portion of a revolution, the upward displacement of the free end of lever 26 being followed by an immediate return to its original position once during each revolution of the index axle 14.

Referring to Figs. 1 and 2, this rotative or oscillatory movement of the shaft 20 is translated into linear step by step upward advance of a plunger 38 by means of several connected links including a crank 28 fulcrumed on that end of shaft 20 which extends into the casing 18. A connecting rod 30 is linked at one end to the free end of crank 28 and at its other end to a lever 32 which in turn is pivotally mounted at 33. The tension of a spring 34 affixed to the lower end of rod 30 and to an adjustment bolt 35 supported by a stationary bracket 36, serves to normally hold the members 32, 30, 28, 20 and 26 in the position illustrated. Pivotally mounted on the other end of lever 32 is a dog or pawl 37 adapted to engage or mesh with the notches between the teeth of the toothed plunger or ratchet 38. The pawl 37 is normally held in engagement with the teeth of the plunger 38 by a spring 39 rigidly affixed to a stationary bracket bearing 40 journalling the plunger 38. Upon each revolution of the meter index axle 14 the pawl 37 is pulled out of engagement with one plunger notch and forced into engagement with the notch next below, so that as the lever 32 is returned to its normal position the plunger 38 is advanced upwardly a predetermined distance equivalent to or slightly greater than its notch or tooth pitch. A pawl 41, held in engagement with the teeth of plunger 38 by a spring 42, functions to prevent the plunger 38 from dropping back during the instant the pawl 36 is withdrawn from engagement with the teeth of plunger 38 by depression of that end of lever 32 on which it is pivoted. In this manner the plunger 38 is elevated step by step, and its travel is communicated through a bell crank lever 44, pivoted to the casing 18 at 46, to the recording pen 48 of the recording instrument, causing the pen point to advance across and make a visible line on a suitably graduated chart 50 mounted on the face of the recording instrument (see Fig. 4). The chart 50 is mounted in the conventional manner on a rotatable disk and shaft which is driven by a clock-work chart operating spring through suitable gearing and escapement mechanism (not shown). The chart operating spring corresponds to the time spring in a clock, and as the clock-work mechanism of the recording instrument is of the usual type, illustration and description thereof is deemed unnecessary. The stud 52 (Fig. 4) represents the point at which the chart is centrally mounted and about which it rotates.

In the design illustrated the step by step advance of the recording pen 48 over the face of the chart 50 might be continued indefinitely. In order to secure a permanent record of the rate of flow of gas through the meter 10 on a chart of standard dimensions chronometrically operated mechanism is provided for returning the recording pen to the zero position on the chart after the elapse of a certain predetermined unit interval of time, for example every fifteen minutes. This mechanism is illustrated in Fig. 2 and its design and operation is substantially as follows:

At the end of every fifteen minute period (or whatever period is chosen for the operation of the release mechanism) during which a step by step advance of the pen 48 from its starting position on the chart 50 has proceeded, a second spring (not shown) in the clock work mechanism operating the recording instrument (equivalent to the spring operating the striking hammer in the usual clock) may be released and through gearing operate a cam 54 (see Fig. 2) which actuates a pivoted lever 56 to depress the end thereof opposite that with which the cam 54 engages. As the free end of lever 56 depresses, pins 58 and 60 thereon respectively come in contact with and disengage pawls 41 and 37 from plunger 38, thus allowing the plunger to be returned immediately to its bottom or starting position by spring 61. At the same time the pen 48 and the crank 44 are returned to a zero position by the combined release of the plunger and the tension on a spring 61.

The releasing mechanism illustrated in Fig. 2 is powered directly from the chart operating spring corresponding to the time spring in a clock (not shown). A cam or snail 62 driven by the chart operating spring through an intermediate train of gears (not shown) revolves once during a fifteen minute interval (or whatever may be the chosen time interval) in a counter clock-wise direction. A few moments after the cam 62 has reached the position illustrated in Fig. 2 the left end of pivoted lever 64, resting on the periphery of the cam, drops off the high point of the cam by reason of the tension on a spring 66. The right end of the lever 64, on the opposite end of the pivoted center 68, is thereby raised, freeing the pin 70 on a gear 72 from engagement with the outer face of a bumper 74 on lever 64. The freeing of the pin 70 from engagement with the bumper 74 (see Fig. 5) allows the gear wheel 72 to make almost a complete revolution about its axis, such revolution being stopped, however, by the striking of pin 70 against the outer surface of a second bumper 76 mounted on the end of the lower arm 78 of the bifurcated right hand end of the lever 64. As cam 62 continues to revolve, the surface of bumper 76 will be depressed until the pin 70 will clear its upper edge, at which time the wheel 72 will continue its revolution until the pin 70 again strikes the surface of bumper 74. A similar cycle occurs for each revolution of the cam 62. The gear wheel 72 is driven by a secondary spring (not shown) corresponding to the spring driving the striking mechanism in an ordinary clock. The teeth on wheel 72 mesh with the teeth on a second gear wheel 80 which has the same diameter as wheel 72 and revolves at the same speed, but in a reverse direction (i. e., counter clockwise direction). The cam 54 is secured to the same axle 82 about which wheel 80 revolves, and thus revolves with and at the same speed as wheel 80. Once during each revolution of the cam 54 a projection 84 on the periphery thereof comes in contact with, and elevates, the free end of pivoted lever 56, which is held in normal engagement with the periphery of cam 54 by the tension of a spring 86. Elevation of the right hand end of lever 56 depresses the left end of the lever with the two pins 58 and 60, causing the two pawls to disengage from plunger 38 and return the plunger to its starting position in the manner heretofore described. The speed of rotation of gear wheel 80 is controlled by a suitable gear train and fly (not shown).

The operation of the fluid demand recording apparatus above described is such that the line drawn on the chart 50 by the pen 48 advances on the chart from the zero circle to the point representing the total volume of fluid passed by the meter during the fixed time interval for which the releasing mechanism is set, the pen then returning to the zero line of the chart at the end of such interval. With this type of record the peak point of the curve drawn by the pen on the chart is the point which is commonly used for purposes of calculations. Should it be desired to express the fluid demand or rate of flow of fluid indicated by a record of this type in terms of cubic feet per hour or similar unit, it will obviously be necessary to multiply the quantity of fluid indicated by the record as having passed in the unit time interval by the ratio of an hour to the unit period. Thus to determine the maximum hourly demand of gas passed by the demand recording meter above described, it would be necessary first to determine the fifteen minute period indicated by the record during which the maximum consumption of gas occurs, and to multiply the volume of gas indicated as having been passed during such period by 4.

The form of chart obtained would be somewhat as shown in Fig. 4, which shows the application of a circular type chart. At point "A" the consumption indicated by this chart was 81 cubic feet for the preceding fifteen minutes, which was the largest consumption recorded. The maximum hourly consumption or demand would then be four times this volume or 324 cubic feet. While the recording instrument has been illustrated as provided with a twenty-four hour round chart, it will be understood that the invention is not in any way limited to the type of recording instrument or chart employed, strip or round charts adapted for taking records over a longer or shorter interval of time being equally suitable for this type of apparatus.

In Fig. 3 another modification of the demand recording instrument is shown, designed to serve as a constant integrator for showing instantaneously the rate of flow of fluid through the meter in terms of cubic feet per hour or other suitable unit. In the mechanism of Fig. 3 the operation of cam 62, gear wheel 72, gear wheel 80 and lever 56, with their attendant connecting mechanism, is the same as that previously described. Meshing with the gear wheel 80, however, is another gear wheel 88 of equal diameter. As wheel 80 revolves wheel 88 also revolves at the same rate but in a reverse direction. A cam 90 securing to the face of wheel 88 rotates with wheel 88 and once during each revolution of the cam a projection 92 on the peripheral bearing surface thereof engages with and depresses the free end of lever 94, such lever being pivotally supported at the other end in a stationary bearing 96. The free end of lever 94 is held in engagement with the peripheral bearing surface of cam 90 by a spring 98. A friction block 100, affixed to the lever 94 near the pivotal point 96, is drawn away from its normal position against the periphery of wheel 102, (forming the pivotal base of a pen arm 103) by the depression of the free end of lever 94. This releasing of the friction block 100 from the pivotal base 102 of the pen 48 takes place at or just prior to the instant that the cam 80 acts through lever 56 to disengage the pawls 37 and 41 to thereby drop the plunger 38 to its starting position.

In the operating period immediately prior to the instant that friction block 100 is thrown out of engagement with the face of wheel 102, the lifting or operating plunger 38 has been raised step by step in the manner previously described. This does not operate the pen 48 for the reason that motion of rod 38, communicated by means of lever 44 to the shaft 104 on which the pen wheel 102 is loosely journaled, is absorbed in a coil spring 106, one end of which is fastened to the shaft 104 and the other end to the pen wheel 102 at the point 108. At the end of a predetermined unit operating period the pen wheel 102 is liberated from the pressure of the friction block 100 as previously described, thus permitting the tension on the spring 106 to move the pen arm 48 into proper position on the chart corresponding to the degree of elevation of the free end of lever 44 by the plunger 38. As the point of pen 48 reaches the proper position on the chart representing the maximum volume of fluid passed by the meter 10 during the preceding time interval, it is locked in this position by the reengagement of the friction block 100 with the wheel 102, after which the lever 56 operates as previously explained to disengage the pawls 37 and 41 from engagement with the plunger 38 and thus permit the plunger to drop to its initial or starting position. By properly proportioning the pitch of the teeth on the plunger or ratchet 38, the length of the rod 44, the length of the pen arm 103, and the graduation of the chart 50, a curve will be drawn (see Fig. 3) which shows graphically for each fifteen minute period, (or whatever the operating period may be) the approximate mean rate of flow of fluid in cubic feet per hour (or other suitable unit) through the meter for the preceding fifteen minute period. It will be noticed that during the first time period during which the mechanism is operated, the record on the chart will remain at zero due to the lag of one period between the actual operation and the record thereof on the chart. The recording mechanism shown in Fig. 3 produces a so-called "reversed" type chart wherein the zero line lies at the outer edge. When fluid flows through the meter the pen 48 of the apparatus in Fig. 3 moves towards the center of the chart, and the greater the rate of flow during any unit time interval, the nearer the center of the chart will be the corresponding record.

The form of fluid demand recording apparatus illustrated and above described is applicable to any form of volume measurement type fluid meter affording access to an index axle or other equivalent meter part driven by, and at proportional rate to, flow of fluid through the meter. In some instances it may be necessary or desirable to obtain a motivating speed for the recording mechanism which is higher or lower than that of the index axle or other meter part used to power the demand recording device. In such event a simple two or three gear train may be inserted between such meter part and the lever 26 or equivalent part forming the initial member of the recording apparatus.

Having thus described my invention, what I claim as new is:

1. Fluid demand recording apparatus of the constant integrating type embodying a volume measurement type fluid meter and a chronometrically operable recording instrument, said meter having a part movable by and at a rate proportional to the rate of flow of fluid therethrough, a recording member for said instrument loosely journalled on a crank shaft, means normally locking the recording member in a stationary position, mechanism operatively connecting said recording member with said movable part of said meter, a device operatively connected to the recording member and to the crank shaft and arranged to absorb power transmitted by said mechanism from said movable meter part, and time controlled means for periodically releasing the locking means and the power absorbed by said device to thereby move the recording member to a position corresponding to the maximum amount of fluid passed through the meter during the unit time interval immediately preceding.

2. In fluid demand recording apparatus embodying in a self-contained unit a fluid volume meter and a chronometrically operable recording chart, the combination of a plunger, ratchet mechanism mechanically connecting said meter and plunger for imparting a step by step advance motion to said plunger proportional to the rate of flow of fluid through said meter, a recording pen adapted to make a record on said chart, means operatively connecting said plunger and pen, and time-controlled means for periodically releasing said ratchet mechanism momentarily and thereby causing said plunger to return to a starting position.

3. In fluid demand recording apparatus embodying in a self-contained unit a fluid volume meter and a chronometrically operable recording chart, the combination of a plunger, ratchet mechanism mechanically connecting a movable part of said meter with said plunger adapted to cause a step by step advance of said plunger proportional to the rate of flow of fluid through said meter, a recording pen adapted to make a record on said chart, means operatively connecting said plunger and pen adapted to cause said pen to advance across said chart from a zero position to a position corresponding to the most advanced position taken by said plunger, and time-controlled means for periodically releasing said ratchet mechanism momentarily and thereby causing said plunger to return to a starting position.

4. In fluid demand recording apparatus, the combination with a volume measurement type meter having an index axle adapted to be rotated by and at a rate proportional to the flow of fluid through the meter, of a radial pin rigidly connected to said axle, a chronometrically operable recording instrument having a recording member, a shaft extending from said meter into said recording instrument, a trip lever fulcrumed on the meter end of said shaft with its free end in the path of said radial pin in position to be tilted by said pin at each revolution of said index axle, ratchet mechanism mechanically connected to the other end of said shaft for translating the oscillatory motion imparted to said shaft by said trip lever into a proportional step by step uni-directional linear advance of the recording member of said recording instrument, and time-controlled means operable to periodically release said ratchet mechanism and cause said recording member to return to a starting position.

5. In fluid demand recording apparatus embodying a volume measurement type meter and a chronometrically operable recording instrument, a ratchet plunger, mechanism operatively connecting said meter and plunger for causing a step by step linear advance of said plunger at a rate proportional to the rate of flow of fluid through said meter, a recording member for said instrument, an operative connection between said recording member and said plunger, a latching device arranged normally to hold said recording member stationary, time-controlled mechanism operative to periodically release said latching device for an instant to permit the recording member to move to a position corresponding to the advanced position of the plunger, and additional time-controlled means operable to periodically cause said plunger to return to a starting position.

6. Fluid demand recording apparatus embodying a volume measurement type meter having flow integrating mechanism and a chronometrically operable recording instrument, a ratchet plunger, means for causing a step by step linear advance of said plunger proportional to the rate of flow of fluid through said meter, a recording member for said instrument loosely journaled on a crank shaft, a crank member fulcrumed on said crank shaft with its free end in operable engagement with said plunger, means normally locking the recording member in a stationary position, a coil spring having its opposite ends connected respectively to the recording member and crank shaft, time-controlled means for periodically releasing the tension absorbed in said spring by reason of advance of the plunger for an instant to move the recording member to a position corresponding to the maximum amount of fluid passed through the meter during the unit time interval immediately preceding, and additional time-controlled means for substantially simultaneously returning said plunger to its starting position.

In testimony whereof I affix my signature.

ROBERT H. TAYLOR.